United States Patent [19]

Orima

[11] 4,352,514
[45] Oct. 5, 1982

[54] SHOCK ABSORBING DEVICE
[75] Inventor: Hajime Orima, Sakaimachi, Japan
[73] Assignee: Firster Corporation Limited, Japan
[21] Appl. No.: 154,395
[22] PCT Filed: Dec. 20, 1978
[86] PCT No.: PCT/JP78/00061
  § 371 Date: Aug. 21, 1979
  § 102(e) Date: Aug. 20, 1979
[87] PCT Pub. No.: WO79/00417
  PCT Pub. Date: Jul. 12, 1979
[30] Foreign Application Priority Data
  Dec. 21, 1977 [JP] Japan ............................ 52-152949
[51] Int. Cl.$^3$ .............................................. B60R 19/06
[52] U.S. Cl. .................................. 293/110; 188/303; 188/376; 293/134
[58] Field of Search ............... 293/107, 110, 132, 134; 188/303, 312, 376

[56] References Cited
U.S. PATENT DOCUMENTS

| | | | |
|---|---|---|---|
| 1,723,508 | 8/1929 | Hansen | 293/134 |
| 3,097,725 | 7/1963 | Peterson | 293/134 |
| 3,362,742 | 1/1968 | Sanderson | 293/134 |
| 3,797,872 | 3/1974 | Watanabe et al. | 293/134 |
| 3,837,695 | 9/1974 | Haase et al. | 293/110 |
| 3,927,901 | 12/1975 | Weman | 293/107 |
| 4,176,858 | 12/1979 | Kornhauser | 293/107 |

FOREIGN PATENT DOCUMENTS 1386545  3/1975  United Kingdom ................ 293/110

Primary Examiner—Joseph F. Peters, Jr.
Assistant Examiner—Ross Weaver
Attorney, Agent, or Firm—Finnegan, Henderson, Farabow, Garrett & Dunner

[57] ABSTRACT

A shock absorbing device comprising a pair of fluid containers (1A, 1B) interconnected by a restriction passage (5), each of the fluid containers being provided with a piston (3A, 3B) which is slidably mounted to the respective fluid container, in a fluid-tight fashion, so that one end of each of the pistons is projected outwards from the respective fluid container, and a closure valve (7) which is provided in the restriction passage (5) and which can be broken when a fluid pressure of a predetermined value acts on the closure valve.

2 Claims, 2 Drawing Figures

SHOCK ABSORBING DEVICE

DESCRIPTION

1. Technical Field

This invention relates to a shock absorbing or shock damping device for absorbing or damping a shock, which occurs, for example, in the case of a collision of vehicles, by discharging the shock energy out of the device.

2. Background Art

A known shock absorbing or damping device used for, for example, an automobile, absorbs the shock inside the device to damp or disperse the shock and, accordingly, the total shock energy in the automobile is not decreased. That is, the shock applied to a portion of the automobile can be temporalily damped, but the damped shock energy must be always absorbed by another portion of the automobile.

DISCLOSURE OF INVENTION

The object of the invention is to provide an outside absorption type of a new shock absorbing device which is quite different from the above mentioned inside absorption type of a shock absorbing device. That is, according to the invention, the shock is not absorbed in the device but is discharged out of the device. In the shock absorbing device according to the invention, each of a pair of fluid containers interconnected by a restriction passage is provided with a piston which is slidably mounted to the respective fluid container, in a fluid-tight fashion, in such a way that one end of each of the pistons is projected outwards from the respective fluid container. In the restriction passage is arranged a closure valve which can be broken when a fluid pressure of a predetermined value acts on the closure valve. As a result, when a shock is applied to the outer end of one of the pistons, the compression pressure of the fluid in the corresponding fluid container causes the closure valve to be broken to project the piston outward of the other fluid container by means of the fluid in the latter, thereby to release the shock outside the device.

Furthermore, according to the invention, there is provided a safety device for transporting means to which the above mentioned type of shock absorbing device is mounted. The transporting means comprises a front portion and a rear portion which are constructed by parts separated from the body of the transporting means and which are movably mounted to the transporting means body with a predetermined gas therebetween, provided for the displacement of the above-mentioned portions of the means. The outer ends of the pistons are connected to the separate front portion and rear portion, respectively.

BEST MODE FOR CARRYING OUT THE INVENTION

Figure 1:
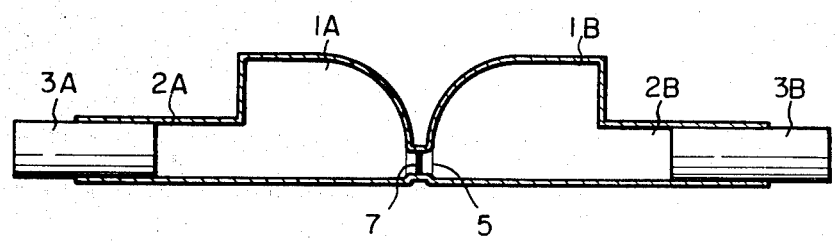
FIG. 1 is an illustration of a principal construction of a shock absorbing device according to the invention.

The invention will be discussed below with reference to the accompanying drawings. FIG. 1 illustrates a principle of a shock absorbing device according to the invention, which includes a pair of containers 1A and 1B. The containers 1A and 1B are, for example, in the form of generally cylindrical sealed containers in which a gas, a liquid or a mixture of a gas and a liquid is contained. The fluid to be contained in the containers 1A and 1B is preferably an incombustible fluid when the device illustrated in FIG. 1 is used as a vehicle safety device. The containers 1A and 1B are connected to each other by means of a restriction passage 5, in which a closure valve 7 is arranged. The closure valve 7 is, for example, comprised of a diaphragm or a membrane of a synthetic resin and is broken when a fluid pressure of a predetermined value is applied to the valve. That is, the containers 1A and 1B are normally separated from one another by means of the closure valve 7 and can be communicated with one another by means of the restriction passage 5 only when the valve 7 is broken. The containers 1A and 1B are provided with cylinder portions 2A and 2B, in which pistons 3A and 3B are slidably mounted in a fluid-tight fashion by means of piston rings (not shown) or any other seal members, respectively. The outer ends of the pistons 3A and 3B extend outward from the cylinder portions 2A and 2B, respectively. The pistons 3A and 3B may be freely and slightly movable or maintained at their initial positions when no external force acts on the pistons.

According to the above mentioned construction, when an impact force or a shock above a certain value acts on, for example, the outer end of the piston 3B, the pressurized fluid in the container 1B is compressed so that the compression force causes the closure valve 7 to be broken. As a result of this, the compression force of the fluid in the fluid container 1B is transmitted to the fluid in the container 1A via the restriction passage 5, so that the piston 3A is moved outward due to the compression force of the fluid in the container 2A. In principle, the inward displacement of the piston 3B corresponds to the outward displacement of the piston 3A. It will be easily understood that the above mentioned discussion is applicable to the case where the piston 3A is subjected to a impact force, except that the operation is reversed.

According to the invention, since only the valve 7 is broken when the device is subject to an impact, the device can be re-used by the replacement of the valve 7. It is also possible to extend or by-pass the restriction passage 5 in appropriate directions in order to easily effect the replacement of the valve 7.

The connecting passage 5 is in the form of a restriction passage, so that the shock applied to one of the pistons is not directly applied to the other piston and the damping effect can be increased. The diameter of the passage, i.e. the degree of the restriction, depends on the diameter and the volume of the containers 1A and 1B. It is not advisable to make the diameter of the passage 5 and that of the containers 1A, 1B equal, because such an arrangement means that the impact force is directly applied from one piston to the other.

It is also possible for the containers 1A and 1B to contain a gas and a fluid, in order to increase the damping effect of the device. This allows the impact to be transmitted from one piston to the other piston via the route of: one piston→the gas (or the liquid) in the container of that piston→the liquid (or the gas) in the container of that piston→the gas (or the liquid) in the other piston container→the liquid (or the gas) in the other piston container→the other piston. Such a route consisting of two kinds of fluid is superior in its damping effect to a route consisting of one kind of fluid, i.e. one piston→the liquid or the gas in the container of that piston→the liquid or the gas in the other piston container→the other piston.

Further, the shock absorbing device of the invention can be installed in desired positions by modifying the shape and/or the length of the cylinder portions 2A, 2B, i.e., for example by bending the cylinder portions 2A, 2B.

Furthermore, according to the invention, the device serves as elastic damper means identical to spring means when no external impact or shock is applied or when the external force is less than a predetermined value at which the valve 7 is broken, since preferably the pistons 3A and 3B are freely and slightly movable.

According to the invention, since the shock energy is not absorbed or stored in the device but is discharged outside of the device, when the device is installed, for example, in a vehicle or the like, the vehicle body is free from the shock to a certain extent.

Figure 2:
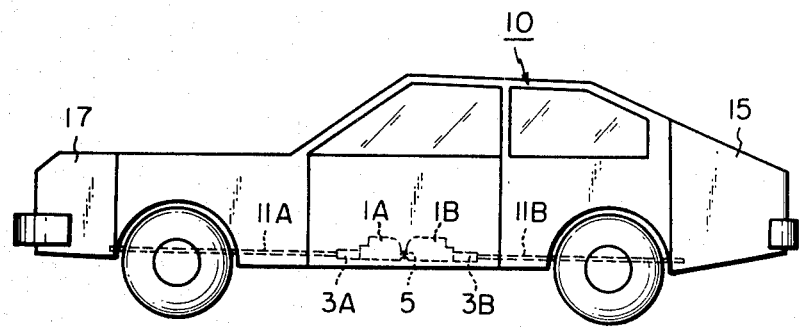
FIG. 2 is a side view of an illustration of an automobile to which is mounted the shock absorbing device illustrated in FIG. 1.

FIG. 2 is a side view of an illustration of an automobile provided with the shock absorbing device illustrated in FIG. 1. Referring to FIG. 2, a pair of shock absorbing devices can be provided on both sides of an automobile 10 in a parallel arrangement. Alternatively it is also possible to provide a single shock absorbing device at the center portion of the automobile 10. The shock absorbing device or devices can be mounted, for example, under the floor of the automobile and the pistons 3A and 3B are provided, on their outer ends, with rods 11A and 11B which extend therefrom, and which are connected to a front portion 17 and a rear portion 15 of the automobile body, respectively. The front and rear portions 17 and 15 must respectively be constructed separate and separated from the body 10. Further, the outer surfaces of the front and the rear portions 17 and 15 are stepped with respect to the outer surface of the body 10 to cause the front and the rear portions 17 and 15 to respectively move into or on the body 10. In order to ensure the movement of the front and rear portions 17 and 15, there must be provided between the front and the rear portions and the body 10, spaces or gaps to ensure the displacement of the front and the rear portions, i.e. the displacement of the pistons 3A and 3B, and rods connected thereto. In order to provide such spaces or gaps, for example, an engine compartment at the front portion of the automobile and an trunk compartment at the rear portion of the automobile can be enlarged. The enlargement would, of course, cause the full length of the automobile to be increased.

With the construction as mentioned above, when, for example, the automobile is struck from behind and the rear portion 15 is subject to an impact, the rear portion 15 moves or slides into or on the body 10 while pushing the rod 11B and, accordingly, the piston 3B. As a result, the front portion 17 is projected from the body 10 by an amount equal to the displacement of the rear portion 15 to discharge the impact energy outside of the automobile. It will be appreciated that the impact force has no influence on the body 10 and persons in the automobile can be safely protected from the shock of the collision and such injuries as whiplash. When the front portion 17 collides with something, the rear portions 15 is similarly projected outward from the body 10, so that the collision has no influence on the body 10 itself. In addition, since something such as another automobile against which the automobile collides is subject to a damped impact, it is very advantageous to incorporate the shock absorbing device of the invention in automobiles.

The invention is not limited to a safety device for an automobile, but can be used as a safety device for transporting means, such as aeroplanes, vessels, railway cars or the like. It is important that the front and the rear portions of the transporting means be constructed as a separate part from the body of the transporting means and that the separate front and rear portions are connected to the body in such a way that there are provided spaces which are large enough to ensure the displacement of the front and the rear portions by an amount corresponding to the displacement of the pistons, between the front and the rear portions and the body, respectively. The outer ends of the pistons are connected to the front and the rear portions of the transporting means, respectively.

If the spaces present a undesirable appearance from the point of view of design, the spaces can be provided in the transporting means as shown in FIG. 2 so that the spaces are invisible from the outside, and the front and the rear portions are slightly stepped with respect to the transporting means body so as to move or slide the two portions in or on the body. In such a case the spaces substantially have no influence on the appearance of the conventional transporting means.

It is also possible to provide generally spherically shaped fluid containers 1A and 1B which are provided with a plurality of pistons extending in multi-directions in order to effectively protect a transporting means from collisions from substantially all directions.

Finally, it is also possible to connect one of the pistons to a roof or a bottom or any other portions of a transporting means, instead of a front portion or a rear portion. In such a modification, when the other piston is subject to a shock or an impact, the roof, the bottom or any other portions is projected outward from the body of the transporting means.

I claim:
1. A shock absorbing device comprising:
    a pair of slightly separated, substantially rigid fluid containers;
    a passage of restricted size connecting said containers to each other;
    a piston slidably mounted in fluid-tight fashion in each container, one end of each piston projecting outward from its respective container;
    each container containing a compressible gas and a liquid; and
    a frangible closure valve positioned in said passage separating the gas and liquid contained in one container from the gas and liquid contained in the other container, said closure valve being rupturable when the fluids in either container reach a predetermined pressure, whereby when a force above said predetermined pressure is applied to the projecting end of one of said pistons, the pressure of the fluid in the corresponding container ruptures the closure valve, allowing the fluid to pass between said containers and causing the other piston to extend outwardly of its container, thereby absorbing the shock of the force applied to said one piston.
2. The shock absorbing device of claim 1, mounted in a substantially central portion of the body of a transport means, said transport means including front and rear portions which are formed separately from and movable with respect to said body, the projecting ends of said pistons associated with said containers being connected to said front and rear portions, respectively, whereby said device absorbs and dissipates a force of a magnitude sufficient to rupture the closure valve when applied to either said front or rear portions of the transport means.

* * * * *